(12) United States Patent
Kolenda

(10) Patent No.: US 6,272,977 B1
(45) Date of Patent: Aug. 14, 2001

(54) DOUGH PRESS DIE FASTENING SYSTEM

(75) Inventor: David Kolenda, Hammond, IN (US)

(73) Assignee: AM Manufacturing Co., Dolton, IL (US)

( * ) Notice: Subject to any disclaimer, the term of this patent is extended or adjusted under 35 U.S.C. 154(b) by 0 days.

(21) Appl. No.: 09/497,706

(22) Filed: Feb. 4, 2000

(51) Int. Cl.⁷ ................................................. A21C 11/00
(52) U.S. Cl. .......................... 99/349; 99/353; 425/394; 425/398
(58) Field of Search ..................... 99/349, 353; 100/246; 425/394, 398

(56) References Cited

U.S. PATENT DOCUMENTS

| | | | |
|---|---|---|---|
| 3,124,083 | 3/1964 | Atwood. | |
| 3,379,141 | * 4/1968 | Groth | 99/349 |
| 3,565,015 | * 2/1971 | Jorgensen | 99/349 |
| 4,417,867 | * 11/1983 | Bauer | 425/394 |
| 4,559,002 | 12/1985 | Atwood | 425/394 X |
| 5,074,778 | * 12/1991 | Betts, Jr. et al. | 425/394 |
| 5,396,833 | 3/1995 | Atwood et al. | 99/353 |
| 5,417,989 | 5/1995 | Atwood et al. | 426/27 |

* cited by examiner

Primary Examiner—Reginald L. Alexander
(74) Attorney, Agent, or Firm—Sonnenschein Nath & Rosenthal

(57) ABSTRACT

A die ring for a dough pressing machine is provided which is to surround a die carried on a movable platen. The die ring, which must be vertically movable relative to the die and platen, is held onto the platen by a plurality of fasteners extending through a flange at an outer periphery of the ring. The flange is elevated above a lower face of the die ring so that the fasteners will be spaced above any dough positioned under the die ring on a dough supporting surface.

13 Claims, 3 Drawing Sheets

DOUGH PRESS DIE FASTENING SYSTEM

BACKGROUND OF THE INVENTION

The present invention relates to presses for dough products and more particularly to an improved die ring and fastening system for a dough press.

Dough presses, such as pizza presses, are well known, for example, as disclosed in U.S. Pat. No. 4,599,002 for a single station press and U.S. Pat. No. 5,396,833 for a relatively continuous pizza press line.

In order to form a pizza crust, a reciprocating die is provided in which the die has a contour to form the desired shape of the pizza crust, that is, in some instances the outer periphery of the pizza crust is to be thicker than the central portion, while in other instances the entire crust has a consistent thickness throughout. The die is carried within a surrounding ring, which generally is circular in shape, but could also be of other shapes as well, which serves to guide the die which moves vertically relative to the die ring.

The dough is carried on a continuous belt traveling below the reciprocating die. The belt intermittently stops to allow the die to come down and press the dough into a desired shape.

The die ring is secured to the upper platen of the press to move vertically with the platen and also to move vertically relative to the platen to a limited extent. The die ring has typically been secured to the platen (or a plate carried on the platen) by a plurality of threaded fasteners which extend through a face of the die ring to hold the die ring onto the platen.

The die ring surrounds the die, extends down further toward the belt, and serves to prevent the dough from spreading beyond the inner circumference of the die ring. However, occasionally the dough placement on the belt is not accurate and the face of the die ring comes in contact with dough, causing the dough to be pressed up into the openings where the threaded fasteners are located in the face of the die ring. This causes dough particles to stick in the openings which can become unsanitary and requires frequent and difficult cleaning.

It therefore would be an advantage to be able to provide a way of securing the die ring to the platen without resulting in a difficult to clean die ring.

SUMMARY OF THE INVENTION

The present invention provides for an improved die ring mounting system in which the face of the die ring, which comes into engagement with the conveyor belt carrying dough, or other surface on which dough is located, is uninterrupted and is smooth, thereby facilitating any cleaning required of the die ring.

An outer flange is provided on the die ring through which there are provided holes for receiving fasteners for securing the die ring to the platen. The flange is located in an elevation well above the face of the die ring so that the head of the threaded fastener typically would not come into engagement with any dough that is improperly placed beneath the die.

Preferably the fastener engages through a complete hole in the die ring so that the die ring will be securely held on to the platen and will be unable to move or rotate. The flange may be machined in certain areas to present a smaller dimension in a horizontal direction in order to allow dies to be placed closer to one another laterally and longitudinally.

DETAILED DESCRIPTION OF THE PREFERRED EMBODIMENTS

Figure 1:
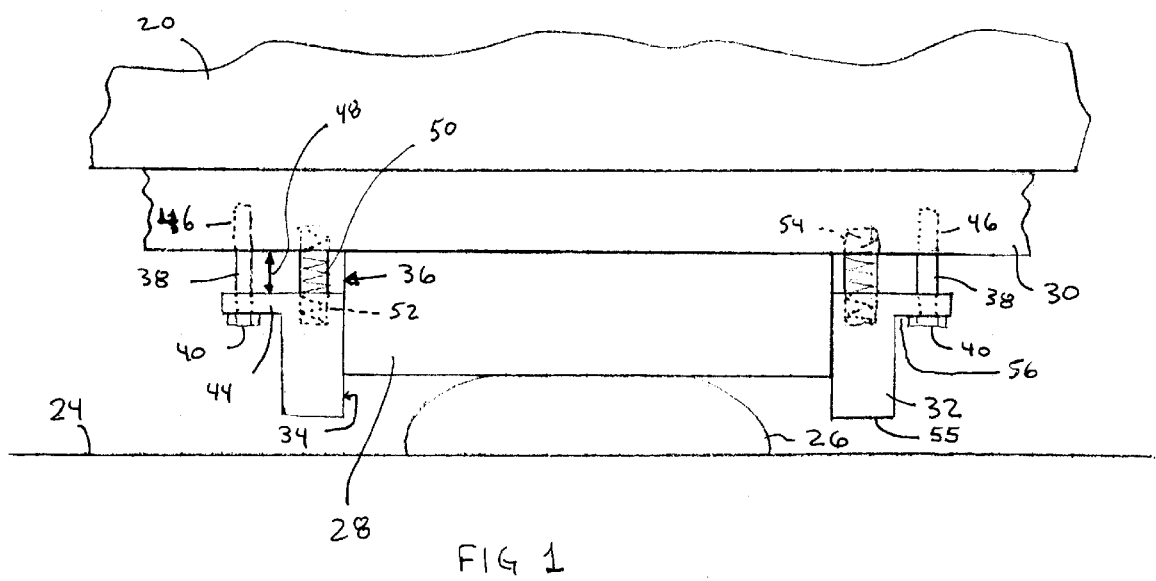
FIG. 1 is a side sectional view of a die ring embodying the principles of the present invention, a die, a platen and a dough surface.
Figure 2:
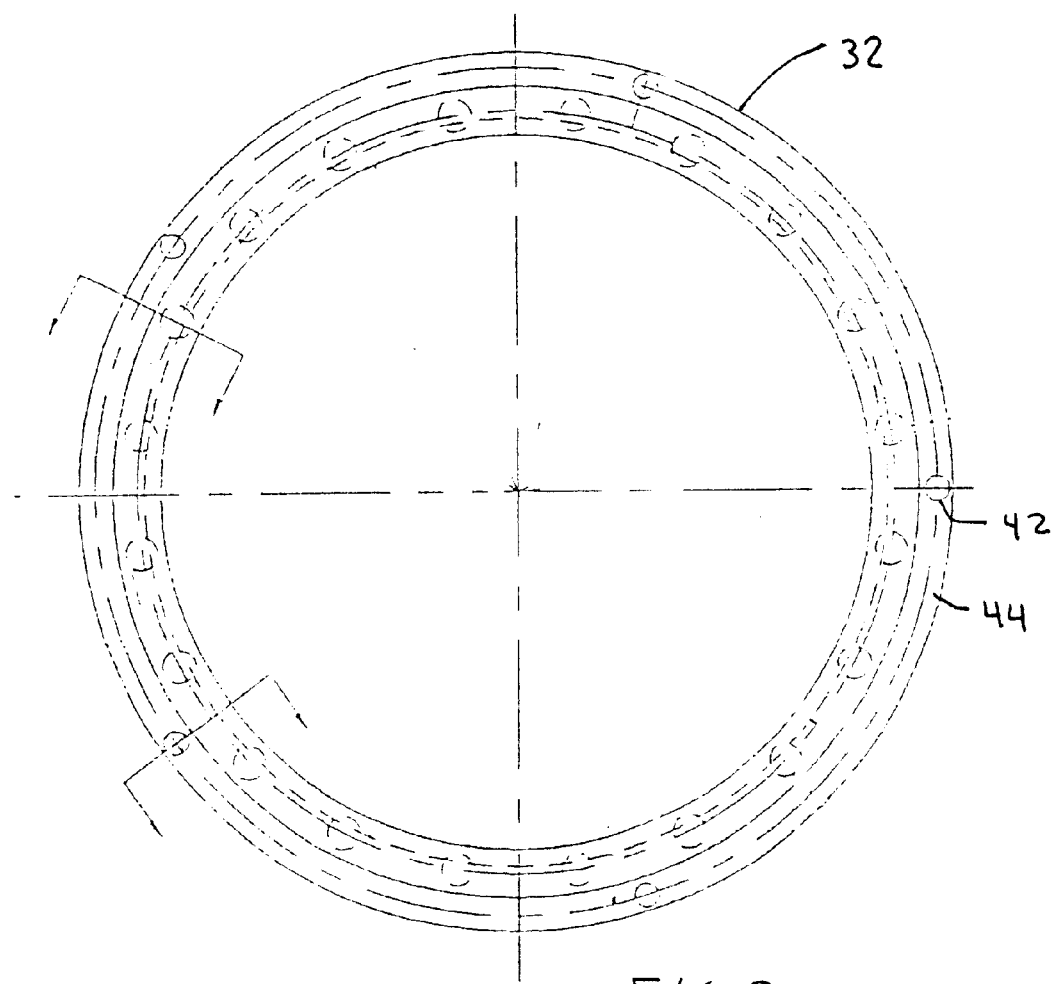
FIG. 2 is a plan view of the die ring of FIG. 1 embodying the principles of the present invention.
Figure 3:
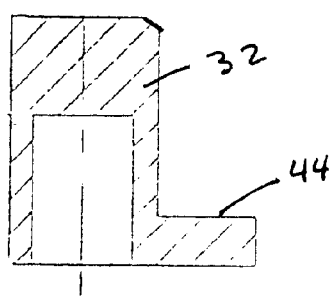
FIG. 3 is a side sectional view of the die ring taken generally along the line III—III of FIG. 2.
Figure 4:
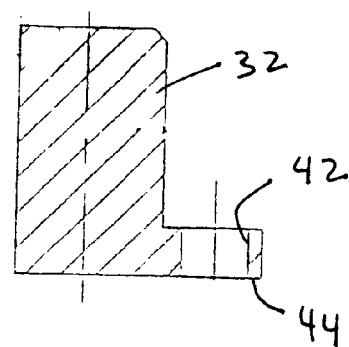
FIG. 4 is a side sectional view of the die ring taken generally along the line IV—IV of FIG. 2.

In FIG. 1 there is illustrated a portion of a dough press which can be used, for example, for pressing dough such as for pizza shells. Such a press is also useful for pressing other dough products including tortillas. The press includes a platen 20 which can be vertically reciprocated, that is, to move toward and away from a dough carrying surface 24. The dough carrying surface 24 could be a stationary surface or could be a movable surface, such as a continuous conveyor belt which is operated intermittently. Positioned on the dough carrying surface 24 is a ball of dough 26 which is to be reshaped, typically in a flatter form than originally presented.

This reshaping occurs by moving the platen 20 downwardly toward the dough carrying surface 24 and interposing a die 28 which comes in contact with the dough 26. The die 28 is secured relatively immobile relative to the platen 20 and may be secured to a plate 30 which in turn is secured to the platen 20. The plate 30 may carry a plurality of dies 28, whose configuration may change depending upon the dough product being pressed. Also carried on the plate 30 is a die ring 32 which surrounds each die 28.

The die ring 32 has an internal diameter 34 which is sized just a few thousandths of an inch greater than an outer diameter 36 of the die 28 in that the die ring 32 is movable relative to the die 28. The die ring 32 is held onto the plate 30 by a plurality of fastening members such as pins 38 having enlarged heads 40 which are received in through holes or openings 42 in a flange area 44 of the die ring 32. The pins 38 may be in the form of threaded fasteners which thread into threaded holes 46 in the plate 30. The heads 40 on the pins 38 prevent the die ring 32 from falling downwardly away from the plate 30. The die ring 32, however, is not snugged up against the plate 30, but rather is spaced a distance 48 away from the plate 30 and is held at the spaced distance by springs 50 which are captured in blind holes 52 in the die ring as well as in blind holes 54 in the plate.

As the press operates, the platen 20 presses downwardly toward the dough carrying surface 24 and the die 28 comes into engagement with the dough 26 and begins to flatten and spread the dough. Before the dough spread too far laterally, the die ring 32 will be moved down to where its lower face 55 engages the dough carrying surface 24 which, in effect, will cause it to act as a wall or barrier against further lateral spread of the dough 26. The platen 20 will continue to move downwardly and the die 28 will continue to also move downwardly and press the dough to a greater extent, thus filling the entire area beneath the die and within the interior of the die ring 32. The space 48 will accommodate this further downward movement of the platen 20 and die 28 toward the dough carrying surface 24, even though the die ring 32 will be stationary relative to the dough carrying surface 24. The pins 38 in conjunction with the openings 42 will prevent the die ring from moving horizontally, or rotating, relative to the die 28.

When the pressing is complete, the process is reversed and the platen and die 28 move upwardly away from the now reformed dough 26 and, subsequently, the die ring 32 will also lift away from the dough carrying surface 24 once the heads 40 on the pins 38 come into engagement with the flange 44.

If the dough 26 were misplaced so that the lower face 55 of the die ring were to engage the dough, a lower surface 56 of the flange 44 will remain elevated above the lower face 55 so that the dough will not engage the lower surface 56, the heads 40 of the pins 38 or the opening 42 in the flange. This will prevent many cleaning problems associated with presently available die rings.

Oftentimes it is desired to press more than one dough ball at a time in order to increase the output of a single piece of equipment. In that event, a plurality of dies 28 are carried on a single platen 20, with the mounting plate 30 accommodating the different configurations for mounting the dies 28 which may be of different shapes.

In order to accommodate a maximum number of dies 28, the lateral spacing between adjacent dies is to be minimized to the greatest extent possible.

Figure 5:
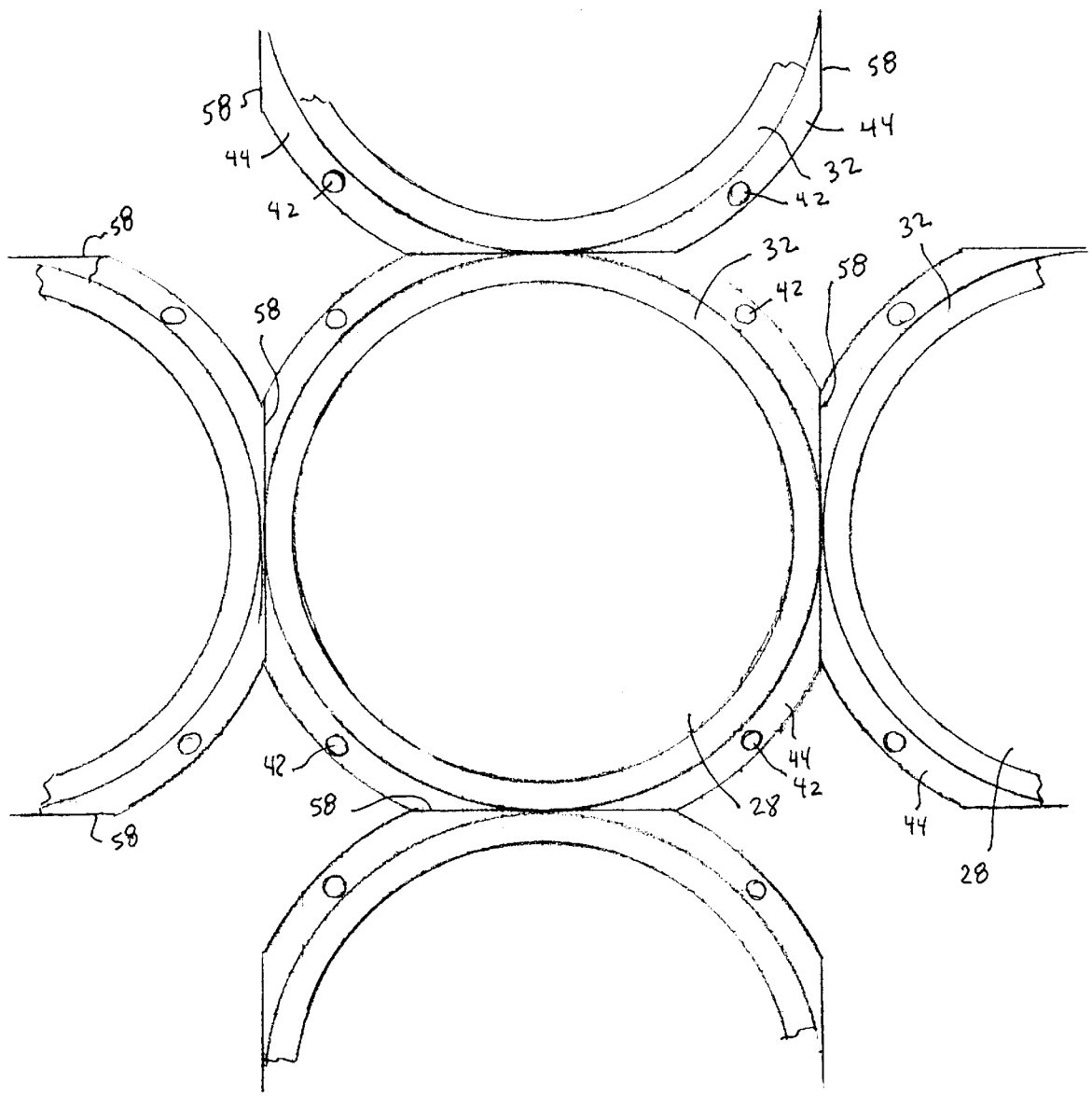
FIG. 5 is a plan view of an alternative embodiment of a die ring embodying the principles of the present invention.

While it is still necessary to have the die ring completely surround each die, the flange 44 has a further lateral dimension which could increase the required spacing between adjacent dies. To minimize the effect of the flange 44 on the spacing of adjacent dies, as shown in FIG. 5, a flat 58 is formed on the flange 44 where a die ring 32 is to be placed adjacent to another die ring 32. The flange 44 still continues in other areas allowing for provision of the through hole 42 to receive the headed pins. In this fashion, a plurality of dies 28 can be accommodated laterally and longitudinally on the plate 30 with a minimum of spacing between adjacent dies. In fact, the spacing could be the same as if the flange was not even present.

Figure 6:
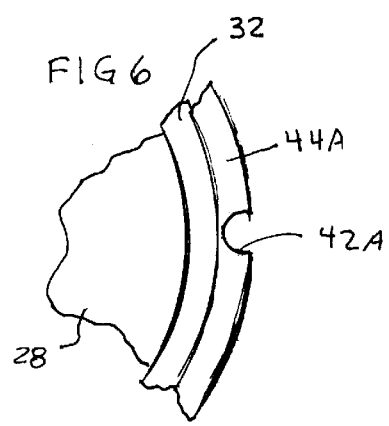
FIG. 6 is a partial plan view of a further alternative embodiment of a die ring embodying the principles of the present invention.

A further alternate embodiment of the die ring 32 is illustrated in FIG. 6, where a narrower flange 44A is provided. Because the flange 44A is narrower, an opening 42A is provided for the pins 38 which is at the periphery of the flange and is open to the periphery. Such an opening 42A still allows for the interaction of the pins 38 and the openings 42A to hold the die ring 32 against rotation, and allows for less material to be used in the provision of the flange. Also, sufficient area is provided around the opening 42A for a large portion of the head 40 of the pin 38 to engage, so that the die ring will be retained on the plate 30. Of course, if greater security between the pins 38 and the die ring 32 is desired, a full flange 44 with the openings 42 positioned completely within the flange, as shown in FIGS. 1–5 should be utilized.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. A die retaining ring for use in a dough pressing machine with a die carried on a reciprocating platen for pressing a dough ball against a dough supporting surface, comprising:
   a ring having an internal diameter sized to receive a selected die and a lower face for engagement with said dough supporting surface;
   a flange on an outer diameter of said ring, said flange having a lower surface spaced upwardly from said lower face and having a generally circular periphery with a plurality of flats formed around its circumference; and
   a plurality of openings extending through said flange for receiving fastening members to attach said ring to said platen.

2. A die according to claim 1, wherein said openings are located completely within said flange.

3. A die retaining ring for use in a dough pressing machine with a die carried on a reciprocating platen for pressing a dough ball against a dough supporting surface, comprising:
   a ring having an internal diameter sized to receive a selected die and a lower face for engagement with said dough supporting surface;
   a flange on an outer diameter of said ring, said flange having a lower surface spaced upwardly from said lower face and having a generally circular periphery with a plurality of flats formed around its circumference; and
   a plurality of openings extending through said flange for receiving fastening members to attach said ring to said platen;
   wherein said openings are located at a periphery of said flange and are open to said periphery.

4. A die retaining ring for use in a dough pressing machine, comprising:
   a ring shaped member having an open internal diameter, a lower horizontal face, a flange extending radially outwardly from an outer diameter of said ring shaped member, with a lower surface of said flange spaced upwardly from said lower face and having a generally circular periphery with a plurality of flats formed around its circumference; and
   a plurality of openings extending vertically through said flange.

5. A die according to claim 4, wherein said openings are located completely within said flange.

6. A die according to claim 4, wherein said openings are located at a periphery of said flange and are open to said periphery.

7. A dough pressing machine comprising:
   a reciprocating platen;
   a plurality of dies carried on said reciprocating platen for movement therewith;
   a dough supporting surface for supporting a dough ball;
   a plurality of die rings carried on said reciprocating platen with each surrounding one of said dies;
   each die ring having a lower face for engagement with said dough supporting surface, a flange on an outer diameter of said ring spaced upwardly from said lower face, and a plurality of openings through said flange;
   a plurality of fastening members extending through said openings to secure said die rings onto said reciprocating platen;
   said dies and die rings being positioned on said platen in a close packed array, and wherein
   said die ring flanges are generally circular, however, each have flats formed thereon where adjacent die rings are positioned in order to reduce a required spacing between adjacent die rings.

8. A dough pressing machine according to claim 7, including a mounting plate carried on said platen to which said dies and said die rings are secured, said dies being immovably secured relative to said plate and said die rings being movably secured to said plate.

9. A dough pressing machine according to claim 8, wherein springs are positioned between said die rings and said plate to urge said die rings away from said plate.

10. A dough pressing machine according to claim 7, wherein said openings are located completely within said flange.

11. A dough pressing machine according to claim 7, wherein said openings are located at a periphery of said flange and are open to said periphery.

12. A dough pressing machine according to claim 7, wherein said dough supporting surface is stationary.

13. A dough pressing machine according to claim 7, wherein said dough supporting surface is movable.

\* \* \* \* \*